US011216222B2

(12) United States Patent
Veenma (10) Patent No.: US 11,216,222 B2
(45) Date of Patent: Jan. 4, 2022

(54) PRINTING METHOD AND SYSTEM FOR SERIALIZED INFORMATION

(71) Applicant: Dover Europe Sàrl, Vernier (CH)

(72) Inventor: Roger Veenma, Barcelona (ES)

(73) Assignee: DOVER EUROPE SÀRL, Vernier (CH)

( * ) Notice: Subject to any disclaimer, the term of this patent is extended or adjusted under 35 U.S.C. 154(b) by 0 days.

(21) Appl. No.: 17/057,011

(22) PCT Filed: May 21, 2019

(86) PCT No.: PCT/EP2019/063131
§ 371 (c)(1),
(2) Date: Nov. 19, 2020

(87) PCT Pub. No.: WO2019/224207
PCT Pub. Date: Nov. 28, 2019

(65) Prior Publication Data
US 2021/0208822 A1    Jul. 8, 2021

(30) Foreign Application Priority Data

May 21, 2018  (EP) .................................. 18173434

(51) Int. Cl.
*G06F 3/12*  (2006.01)
*G06K 1/12*  (2006.01)
(Continued)

(52) U.S. Cl.
CPC .......... *G06F 3/1211* (2013.01); *G06F 3/1206* (2013.01); *G06F 3/1208* (2013.01);
(Continued)

(58) Field of Classification Search
CPC .... G06F 3/1206; G06F 3/1208; G06F 3/1243; G06F 3/1285; G06F 3/1256; G06K 1/121; H04N 1/0461; G06Q 10/08
See application file for complete search history.

(56) References Cited

U.S. PATENT DOCUMENTS 6,674,923 B1 *  1/2004  Shih ................... H04N 1/00132
                                                    382/305
2007/0119954 A1   5/2007  Barenburg
(Continued)

FOREIGN PATENT DOCUMENTS

WO      03038738 A1    5/2003
WO    2013151499 A1   10/2013

OTHER PUBLICATIONS

International Search Report from International Application No. PCT/EP2019/063131, dated Jul. 25, 2019, 2 pages.
(Continued)

*Primary Examiner* — King Y Poon
*Assistant Examiner* — Michael Burleson
(74) *Attorney, Agent, or Firm* — Tucker Ellis LLP (57) ABSTRACT

The present invention relates to method and system for providing series of serialized unique information on a substrate together with product related information. The method comprising: providing the series of serialized unique information from a batch of serialized unique information, using a printer device (30) able of printing from a digital-based image directly on the substrate in a first instance; storing information about the serialized unique information to a data storage device (20); printing the product related information on the substrate; and analysing the printed serialized unique information and product related information on the substrate.

16 Claims, 5 Drawing Sheets

(51) Int. Cl.
*G06Q 10/08* (2012.01)
*H04N 1/04* (2006.01)
(52) U.S. Cl.
CPC .......... *G06F 3/1243* (2013.01); *G06F 3/1285* (2013.01); *G06K 1/121* (2013.01); *G06Q 10/087* (2013.01); *H04N 1/0461* (2013.01)

(56) References Cited

U.S. PATENT DOCUMENTS

| | | | |
|---|---|---|---|
| 2008/0114482 A1 | 5/2008 | Malachowsky | |
| 2016/0098234 A1* | 4/2016 | Weaver | G06K 15/02 358/1.15 |
| 2018/0121778 A1* | 5/2018 | Jung | G06K 19/07707 |
| 2018/0141686 A1* | 5/2018 | Christman | B65B 59/001 |

OTHER PUBLICATIONS

International Preliminary Report on Patentability from corresponding International Application No. PCT/EP2019/063131, dated Jul. 8, 2020, 18 pages.

* cited by examiner

PRINTING METHOD AND SYSTEM FOR SERIALIZED INFORMATION

TECHNICAL FIELD

The present invention generally relates to applying information on products or items and printing serialized or unique data in particular.

BACKGROUND

In an industrial printing system, an industrial printer is typically configured to print different types of information on various types of information carriers, such as, items, products or articles. One example of an operation of such an industrial printer may be the printing of print information on various types of packages or consumer goods. Commonly, such packages or consumer goods require a great deal of unique or serialized product identifications and content specifications, such as, for example, traceability data, serial numbers, time and dates of packaging, expiry dates, etc.

Moreover, the print information to be printed on the package or consumer goods may vary from one item to the next in a batch of items, from one batch of items to another, from one site of manufacture to another, from one time of manufacture to another, from one type of print technology to another, etc.

Serialized codes may be used for providing a product with unique identity, for example for identification purposes. Some examples of application areas are given below.

The serialized code may be applied as one or several or combinations of barcode symbologies and standards such as GS1, DataMatrix, DotCodes, Codabar, EAN, GTIN, ISBN, UPC, barcodes or QR-codes. Printing these types of codes sensitive and quality of print can be affected due to, for example print speed. As a serialized code is not static and changes for each new print, the printer must alter data and print new data in high speed with high quality and compliant codes, allowing later scan and read of the code.

The most common technologies used for serialization today may include Thermal Ink Jet (TIJ), Thermal Transfer Overprint (TTO), Continuous Ink Jet (CIJ) and Laser. These print technologies are commonly used for per product coding and marking.

Print & Apply (P&A) and Drop-On-Demand (DOD) are used but limited due to the application. These print technologies are commonly used for marking for case packaging and pallet labelling.

TIJ provides a high quality code, utilizes eco-friendly inks but has as a main disadvantage that the production line speed is limited. Variable printing costs are high. Normally, serialized TIJ applications are within the pharma industry.

CIJ technology could also be used. Unfortunately this technology provides a poor quality code (reading issue). Another issue is the utilization of Methyl ethyl ketone (MEK).

Variable printing costs are however low. Last but not least, the production line speed is limited when printing high quality codes.

TTO printing is only possible when printing on a foil web, e.g. with form, fill and seal applications. It does allow good printing speed (1000 mm per sec). Primary packaging lines can run 10.000 mm/sec or even faster, the TTO is still limited in terms of printing speed. Thus, the main disadvantage is the downtime and ribbons and print heads need to be replaced regularly.

P&A provides a high quality print, but only for secondary, tertiary applications. The printing and labelling speed is very limited and suitable for labels to be applied to a box, bag, pallet, etc.

DOD gives a medium quality print (150 dpi). It has a good (medium) print speed and supplies are eco-friendly. Limited applications are possible (boxes, plastic). Some printers may print max 120 m/min=2000 mm/sec. Consequently, barcode quality at that speed is low and unreliable. To increase the quality one step, the speed may be reduced to 1000 mm/sec. Another downside of this technology is the risk of smudging (preventing QR-codes scanning). Variable print cost is medium.

Laser is another method which could be used for serialization. The advantage of Laser is that the line speed can be increased; it is also eco-friendly but has as a main disadvantage that the code quality (e.g. printing an "x" instead of clear dot) decreases and therefore reading the code could become a problem. The laser can produce a full dot, but this is very slow as the "beam" is small so it must sweep the entire area of a barcode element with the beam or produce multiple separate small marks to build up a barcode element. For efficient marking it can produce marking as an X, which is not compliant but is recognized by the scanner. The quality of the code is an important factor due to strict regulations (not compliant). Variable printing costs are low. Print quality goes down, when increasing the line speed.

Digital Printing is not yet a commonly used technology.

Applying serialized code may thus encounter with some problems which must be solved:
- Constraint on printing speed versus production line speed for a serialized code:
  - Production line normally require higher speed for final printing of information than it is possible for printing serialized code with high quality.
- Loss of print quality of the serialized code:
  - Depending on, e.g. print speed and printer type the quality of the serialized code may be affected.
- Limitation on printing technology used;
  - certain technologies can only be used for printing, e.g. on products, boxes or pallets.
- Limitation to applications (primary, secondary, tertiary).
- Limitation on packaging materials used (presence digital printer).
- Limitation to serialization code type used. Manufacturers prefer QR codes or GS1 codes today as these codes can contain more information and are more common in the market. Manufacturers are only considering alternative serialized code types due to the limitation of print speed and print quality. For example, the "dotcode" is considered applicable for the tobacco industry. On the "dotcode" less information can be stored, but can be printed at a higher speed.
- Size of printer equipment can be an issue:
  - Insertion and use of new technology (printing equipment) in existing production line may encounter problems. Installing a digital printer inside a factory may become a problem due to the size of the printer (factory layout).
- Critical uptime is an additional risk (pre-printed):
  - Critical uptime is another big risk as there is no back-up solution possible.
- Security of print (possibility to remove serialized code).

WO 03/038738 mentions bar code information is printed on a printable surface of a product, such as a label or container of the product, or the product itself, during a production run. A first component of a composite bar code symbol, which may identify a product carried in the containers, is either pre-printed or printed during a production run, and a second component (of the bar code), which may identify a lot, batch, expiration date or commodity number, is printed during the production run. Check data may be used to confirm the accuracy of information that is used by a printer computer. A database may be accessed to determine if recovered information from first and second bar code symbols portions is consistent. A standalone printer may supply labels to one or more production lines on an as-needed basis.

This document does not describe a serialized unique code. The description mentions "The NDC is a unique numerical code identifying the manufacturer, product, dosage, strength, and package size or type. The proposed rule is an attempt to reduce the number of errors in dispensing drugs in hospitals and other healthcare facilities. In practice, the bar code on a drug could be matched against a bar code associated with the patient and the patient's drug regime, such as by using bar code provided on a patient's wrist bracelet or medical file. The hospitals would obtain appropriate scanning equipment for scanning the drugs bar code and the patient's bar code, and a computer database would process the data to inform the healthcare professional whether the correct drug/medicine has been obtained." This does not mean that each product obtains a unique serial code. No digital printers are mentioned.

SUMMARY

The present invention offers methods, devices and systems to overcome the above mentioned problems and provides additional advantages described later. The invention according to one aspect provides unique substrate(s) or portion of substrates, which can be used to make for example unique packages (by means of unique serialized code), unique product information carriers, etc.

For these reasons, the invention relates to a method of providing series of serialized unique information on a substrate together with product related information. The method comprises: providing the series of serialized unique information from a batch of serialized unique information, using a printer device able of printing from a digital-based image directly on the substrate in a first instance; transferring and storing information about the serialized unique information to a data storage device; printing the product related information on the substrate; and analysing the printed serialized unique information and product related information on the substrate. In one embodiment, the substrate is used as packaging material. The method may comprise an additional step of analysing the printed serialized unique information prior to printing the product related information. The result of analysing the printed serialized unique information on the substrate and product related information may be used for discarding the substrate or its content. The method may comprise transferring and storing information about the serialized unique information and product related information in a data storage device. The method may comprise scanning printed serialized unique information prior to printing the product related information using an image scanning or recording device. In one embodiment the method may comprise scanning printed serialized unique information and the product related information using an image scanning or recording device. In yet another embodiment the serialized unique information comprises a code that is unique in content and/or appearance for each time the code is generated, wherein each code has a relation to preceding and next code. The serialized code is not reprinted. The serialized information batch is provided one or by several parties depending on data privacy, comprising one or several of government, manufacturer, converter, print service provider, coding manufacturer. The product related information on the substrate may be printed by means of an industrial printer. The serialized unique information may be realized in form of machine readable/recognizable/detectable code, for example one or several of barcode symbologies and standards such as GS1, DataMatrix, DotCode, Codabar, EAN, GTIN, ISBN, UPC, DataMatrix, barcodes or QR-codes, character combination, digit combination, images, printable electrical circuits or printable RFIDs. The method may further comprise generating a merged data comprising merging the serialized unique information with product related information, verifying the merged data and if the merged data matches a set of requirements, filling packages made of the substrate with a unique content.

The invention also relates to a system for providing series of serialized unique information on a substrate together with product related information. The system comprises: a first set of printer device able of printing from a digital-based image directly, a second set of industrial printer, a data storage device, image scanning device, and a controller. The system is configured to print the series of serialized unique information from a batch of serialized unique information, using the printer device able of printing from a digital-based image directly on the substrate in a first instance; transferring and storing information about the serialized unique information to the data storage device; printing the product related information on the substrate using the industrial printer; scanning by the image scanning device the printed information; and analysing by the controller the printed serialized unique information and product related information on the substrate.

BRIEF DESCRIPTION OF THE DRAWINGS

Reference is made to the attached drawings, wherein elements having the same reference number designation may represent like elements throughout the description.

DETAILED DESCRIPTION

In the following, the term "printing" as used herein, may refer to transferring information onto an information carrier or a media.

The term "digital printer" and "digital printing" as used herein, may refer to methods and devices for printing from a digital-based image directly to a variety of media.

The term "industrial printer" as used herein, may refer to a printing or marking device for consumer and industrial goods requiring a great deal of product identification (e.g. expiring dates, traceability data, packaging date, etc.). The information to be printed may vary from one item to another, from one batch of similar items to another, from one site or time of manufacture to another, and/or from one type of print technology to another. One example of an industrial coding and marking environment may be the printing of labels on various types of packages or consumer goods. Another example may be where multiple coding and marking printers, either of same technology or of different technologies are configured to simultaneously print information on various types of products or items (e.g. two sides of a package, combination of visible and invisible printed information, etc.). Thus, an industrial printer may be a peripheral device which makes a persistent human-readable representation of graphics or text onto a substrate.

The term "serialized code", as used herein, may refer to a code that is unique in content and/or appearance for each time it is generated wherein each code may have a connection with preceding and next code. The serialized code should not be reprinted. The serialized code may be realized in form of a machine readable/recognizable/detectable code, for example one or several of GS1 codes, 1D codes, 2D codes such as DataMatrix, DotCode and QR-code, character combination, digit combination, images, printable electrical circuits or RFIDs.

The term "static code" or "static information" as used herein, may refer to any type of recurrent or repeating data/information, which is substantially the same from one print to another. The static code/information may comprise product data/information, content, manufacturing date, and best before date, etc.

In the following description, references are made to digital printers and printing, as a preferred device and method, as these eliminate the need for pre-printed packaging and coding equipment, is eco-friendly and provides a high quality print at medium speed. Of course it should be understood that the invention is not limited to these devices and technologies and similar technologies may be used in accordance with the scope of the present invention.

The general idea of the invention is to print any serialized code, e.g. in form of GS1 code, QR-code, DataMatrix, DotCode QR-code, barcode or similar on any substrate or product using a suitable printer technology such as digital printer before production and print any product data, such as lot number, best before date, content, etc. under or after production. Then the serialized data and product data are merged or associated at or after production by a computer, e.g. within a data storage, e.g. a database or cloud service or smart contract or distributed (e.g. blockchain). In other words a digital file may be divided in two or more digital files before production and merged at or after production inside a database or cloud. One of the files may be variable.

Figure 1:
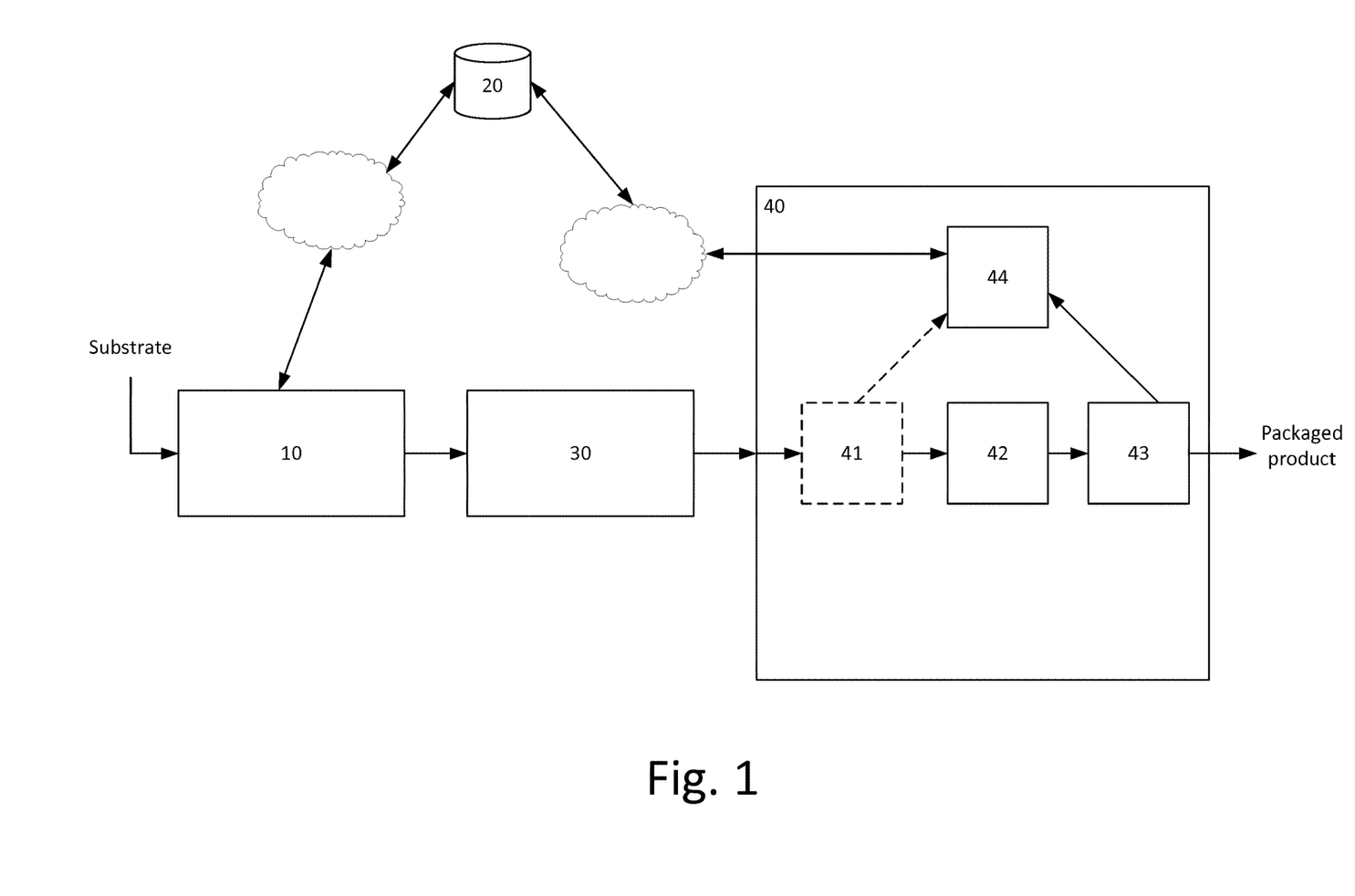
FIG. 1 is a diagram of an exemplary system in which methods and device described herein may be implemented.

According to one exemplary embodiment as illustrated schematically in FIG. 1:

1. The product manufacturer 40 purchases packaging material from a provider 10, e.g. a converter, print service provider or any other third party having printer facilities, such as a digital printer.
2. A unique code package is generated and registered in a database or cloud 20.
3. A digital printer 30 pre-prints serialized codes (unique codes) on the packaging material to make each package unique (e.g. on film role or on packaging sheet).
4. The packaging materials are shipped to the product manufacturer 40. In an optional step, at the factory (production line) 40 of the manufacturer each unique code on the package material may be scanned with a scanner 41 and/or a vision camera. Of course, in one embodiment the unique code may be manually entered at the start of the batch or another code representative of the unique code can be scanned, e.g. a normal sequential number and the correlation is available in a database. The unique code may then be related to product data by the controller 44. If the related data (serialized code and product data) matches certain requirements, the packaging will be filled and if the related data does not meet the requirements, the packaging will be rejected. However, as applications are dynamic printing can happen before or after filling.
5. An industrial printer(s) 42 (such as CIJ, TIJ, TTO, DOD, Laser, etc.) may be used to print a product data on a pre-defined location on the unique packaging. The product data may comprise for example a lot number, best before date, serialized data, content information, manufacturing data, etc.
6. After printing, a scanner 43 and/or vision camera (or any other image acquiring device) scans the unique code and product data.
7. The result of scanned information is provided to a processing system 44. The disparate sets of data are merged (e.g. vertical look-up) or associated and may be stored in the database 20, cloud or digital information (code) distribution system such as blockchain.

At any step of the value chain (distribution network)—manufacturer, wholesaler, distributor, retailer, customer—can effectively scan the unique code to obtain information and use for a variety of purposes.

The unique code package, as mentioned above, can be provided by several parties depending on data privacy, e.g. government, manufacturer, converter, print service provider, coding manufacturer or any other third party. Series of unique codes may be purchased from service providers.

The invention can use any data storage as database 20 or so called cloud service.

Any digital printer able of printing a serialized code can be used; for example: digital printer for packaging and labels, digital printer for textile, digital printer for cans etc.

The substrate or material may comprise any type of material, such as: carton, films, cotton, metal, etc.

Scanning must be carried out at or after printing product data. Scanning before printing of product data is an optional step.

Figure 2:
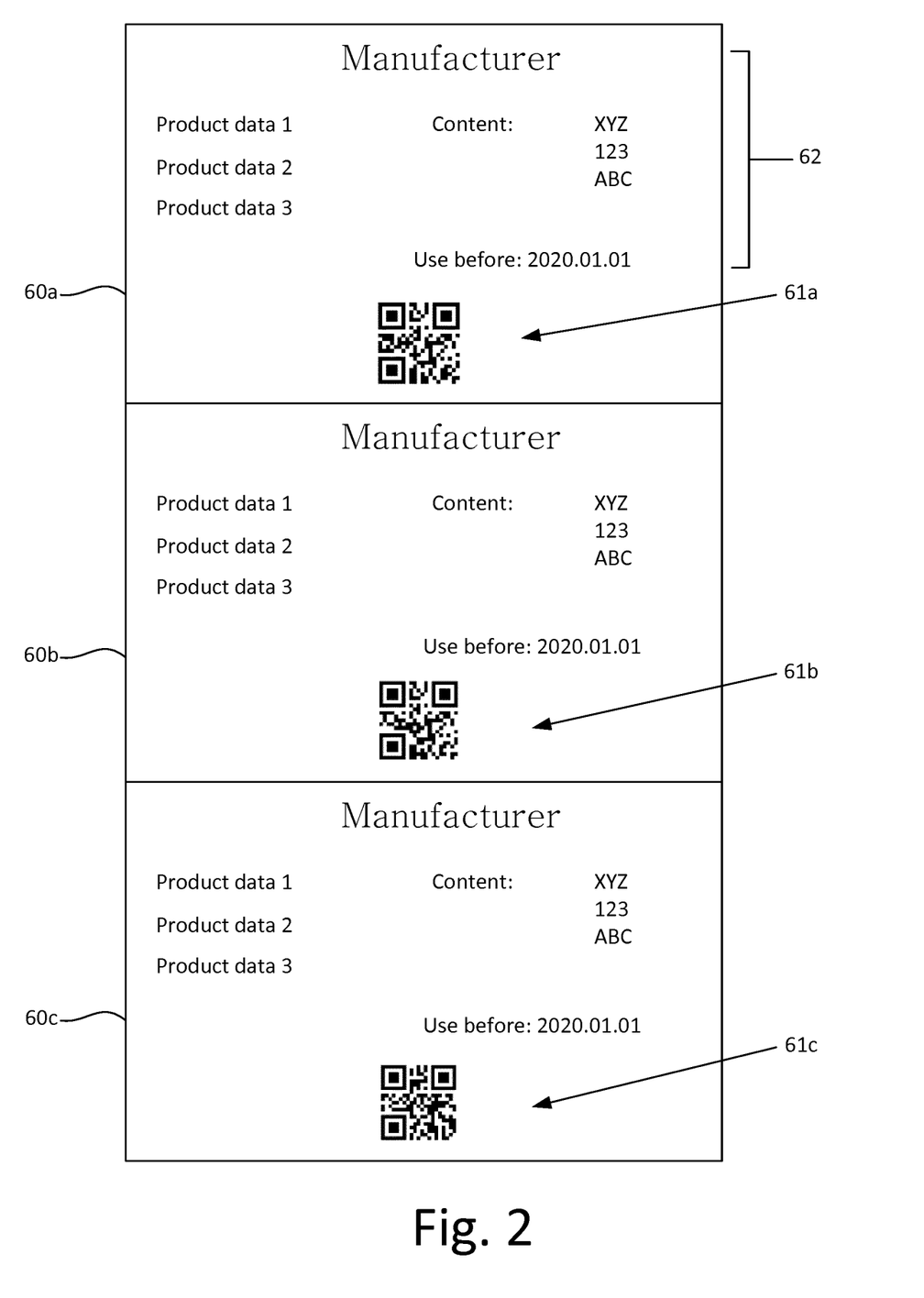
FIG. 2 illustrates a schematic view of label portions printed in accordance with teachings of the present invention.

FIG. 2 illustrates exemplary embodiments of label parts 60a-60c of, e.g. a package comprising serialized portions 61a-61c and static portions 62. The serialized portions 61a-61c are preprinted, when the package material is printed using a digital printer and each comprises a unique serial code, in this case a QR-code. The static portions 62 are printed during production (packaging) and comprise product data same for all products. It is clear that the static portion may also have variable data but not as sensitive as the serialized portion. The static data may also be printed elsewhere on the package. It is also evident that the QR-code, especially due to size, require high print quality (e.g. especially for scanning), which may be an obstacle during high speed printing.

Figure 3:
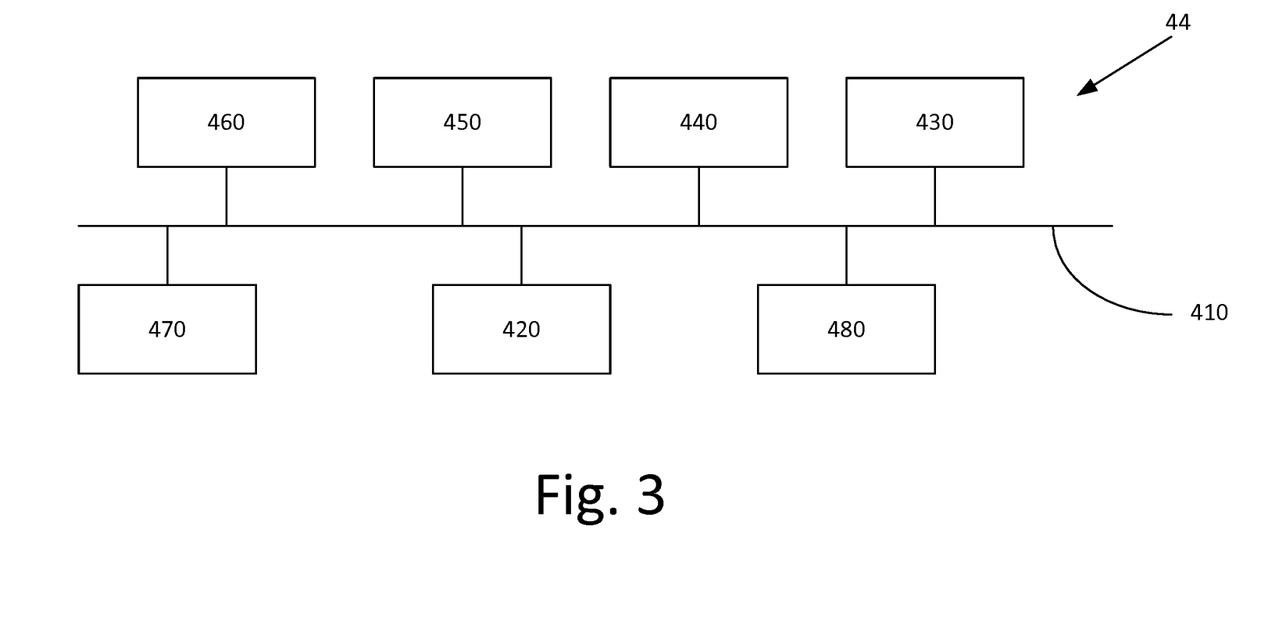
FIG. 3 is a diagram of an exemplary processing system used in the system of FIG. 1.

FIG. 3 is a diagram of an exemplary system 44 in which methods and systems described herein may be implemented. The system 44 may include a bus 410, a processor 420, a memory 430, a read only memory (ROM) 440, a storage device 450, an input device 460, an output device 470, and a communication interface 480. Bus 410 permits communication among the components of system 44. The system 44 may also include one or more power supplies (not shown).

One skilled in the art would recognize that system 44 may be configured in a number of other ways and may include other or different elements.

Processor 420 may include any type of processor or microprocessor that interprets and executes instructions. Processor 420 may also include logic that is able to decode media files, such as audio files, video files, multimedia files, image files, video games, etc., and generate output to, for example a display, etc. Memory 430 may include a random access memory (RAM) or another dynamic storage device that stores information and instructions for execution by processor 420. Memory 430 may also be used to store temporary variables or other intermediate information during execution of instructions by processor 420.

ROM 440 may include a conventional ROM device and/or another static storage device that stores static information and instructions for processor 420. Storage device 450 may include a magnetic disk or optical disk and its corresponding drive and/or some other type of magnetic or optical recording medium and its corresponding drive for storing information and instructions. Storage device 450 may also include a flash memory (e.g., an electrically erasable programmable read only memory (EEPROM)) device for storing information and instructions.

Input device 460 may include one or more conventional mechanisms that permit a user to input information to the system 44, such as a keyboard, a keypad, a directional pad, a mouse, a pen, voice recognition, a touch-screen and/or biometric mechanisms, etc. Output device 470 may include one or more conventional mechanisms that output information to the user, including a display, a printer, one or more speakers, etc. Communication interface 480 may include any transceiver-like mechanism that enables system 44 to communicate with other devices and/or systems. For example, communication interface 480 may include a modem or an Ethernet interface to a LAN. Alternatively, or additionally, communication interface 480 may include other mechanisms for communicating via a network, such as a wireless network. For example, communication interface may include a radio frequency (RF) transmitter and receiver and one or more antennas for transmitting and receiving RF data.

The system may be configured to communicate with the database/cloud 20 through communication interface 480. The processor 420 is further configured to receive information from the scanners/vision cameras 41 and 43 and process the information, e.g. comparing product data with the serialized information, etc. The system 44 may also control the printers and production line.

According to one exemplary implementation, system 44 may perform various processes in response to processor 420 executing sequences of instructions contained in memory 430. Such instructions may be read into memory 430 from another computer-readable medium, such as storage device 450, or from a separate device via communication interface 480. It should be understood that a computer-readable medium may include one or more memory devices or carrier waves. Execution of the sequences of instructions contained in memory 430 causes processor 420 to perform the described acts. In alternative embodiments, hard-wired circuitry may be used in place of or in combination with software instructions to implement aspects consistent with the invention. Thus, the invention is not limited to any specific combination of hardware circuitry and software.

The present invention provides advantages and benefits compared to other printing methods. Some examples of the application areas may include:

Language: Manufacturers are looking for ways to reduce stock. Today they are limited to analog printers pre-printing the required languages. With the invention, they can move to digital language printing which may reduce stock. This further allows for printing the required compliance needs based on the country needs (late stage differentiation). For example, with an analogue printer manufacturers can only print one language. With a digital printer manufacturers can print multiple languages within the same batch. A scanner can recognize the language printed or serialized code and print the localized "best before data" on the packaging. Example: Today a manufacturer is printing 100 products in one language per run. In future, the manufacturer could print "20× English"+"50× German"+"20× German" and "10× Russian" in the same production run. Thus, less stock per language is therefore needed.

Health: Governments are under pressure seeking ways to maximize tax revenues to enforce existing regulations on excise products. They are increasingly aware of the use of product marking both for excise products and for other industries, which increases the likelihood and speed of implementation of marking proposals for e.g. alcohol, tobacco or any other health-risk industry. The industry is looking at implementing nonproprietary product marking technologies, the adoption of global supply chain standards, in order to demonstrate supply chain transparency, and increased control on the value chain. Using the invention, each packaging is made unique which opens the door to fiscal coding (i.e. duty stamps).

Safety: In past years, there have been major problems inside the food industry. With the invention any product can be made unique with unique package.

Environment: Governments are pushing vendors and manufacturers to take ownership in reducing plastic waste. With the invention the industries can stimulate consumers to return the packaging (loyalty program).

Track & Trace: with GS1 coding or other regulatory or customer compliance it is possible to track and trace secondary and tertiary applications. Implementing the invention allows tracking and tracing the primary space as well.

Stock & Return Processes: Presently, when returning products to a store, the retailer has a complicated mix of return processes (RMA) which is an administrative burden for them. Using the invention, the RMA process may be simplified and standardized and greater control over inventory (e.g. clothing industry) may be achieved.

Supermarkets/food-markets: Presently, supermarkets or food markets know the number of products they have on the shelf. However, they don't know how many they still have on the shelf and with which expiry date. Using the invention, markets may attract customers to the store in discounting products who are about to expire (loyalty). Supported also by brands' owners, food gain may be reduced, resulting in better waste control and enhancing environment.

Pay-Per-Print: Presently, not all manufacturers are capable in providing a pay-per-print/pack concept. Having a unique code concept opens the door for vendors to initiate pay per print ability.

Recall Management: recalling a production batch is a difficult task. The invention, allows for end-to-end traceability of all produced products.

Detect/Read/Remove: Normally, entire production lines are often stopped when detecting a "bad packaging". Using the invention, a bad object/package may be rejected at any time during the packaging line process. For example metal detector detects metal inside a product, after detection product is rejected, line keeps on running. Consequently, uptime at factories is more secured.

Anti-counterfeit: anti-counterfeiting measures are increasingly important for products with a reasonable value, such as cosmetics, spare parts, etc. Serialization options may become costly or even not possible for these markets. Using the invention, unique codes can be pre-printed, checking against counterfeit.

Restaurants: Restaurants may suffer from waste problem as they don't have their "fresh food" stock under control. The present invention may help them better managing this problem. For example: food chain restaurant in one country has problem with "stock management". For a number of restaurants there is a need of staff for checking what to order, normally all manually. There is a need for a system, which allows to automatically replenishes their stock when something is taken out of, e.g. their cooling systems.

Distribution centers: Distributors ship full boxes of one and the same item towards supermarkets. Using the invention, "pick and pack" can be done at product level instead of at case level. This could help supermarkets reduce stock levels.

Discounters: with the new invention it is possible for discounters to create "ready to sell cases".

Blockchain: Using the present invention, it may be possible to connect the unique coding towards the blockchain. The unique coding may become an enabler for the blockchain or for example an electronic smart contract and allows for where, when, how it is packaged and manufactured. This can trigger multiple solutions such as: "automatic payments", customers being able to specify the origin of their product in the package (e.g. coffee beans from Thailand instead of Colombia). Thus, digital information (codes) may be distributed but not copied.

Consequently, the present invention provides a number of advantages over the prior technologies, such as:

- No disruption of existing infrastructure at customer/factory as the preprinting will be applied prior to online printing;
- High Return of Investment for manufacturer/packaging industry due to limited investment and reduced costs;
- Suitability for all existing coding technologies using digital printing technology;
- Suitable for all packaging materials due to presence of digital printing;
- Suitable for all applications (primary, secondary, tertiary);
- Suitable for all serialized coding types;
- Size of printer equipment is no longer an issue as digital printer does not need to be installed inside the production line;
- Printing speed is no longer an issue as serialized code is pre-printed;
- Printing quality is no longer an issue as the digital printer is printing at high quality; and
- Uptime is no longer an issue as digital printer does not need to be installed inside the production line.

Figure 4:
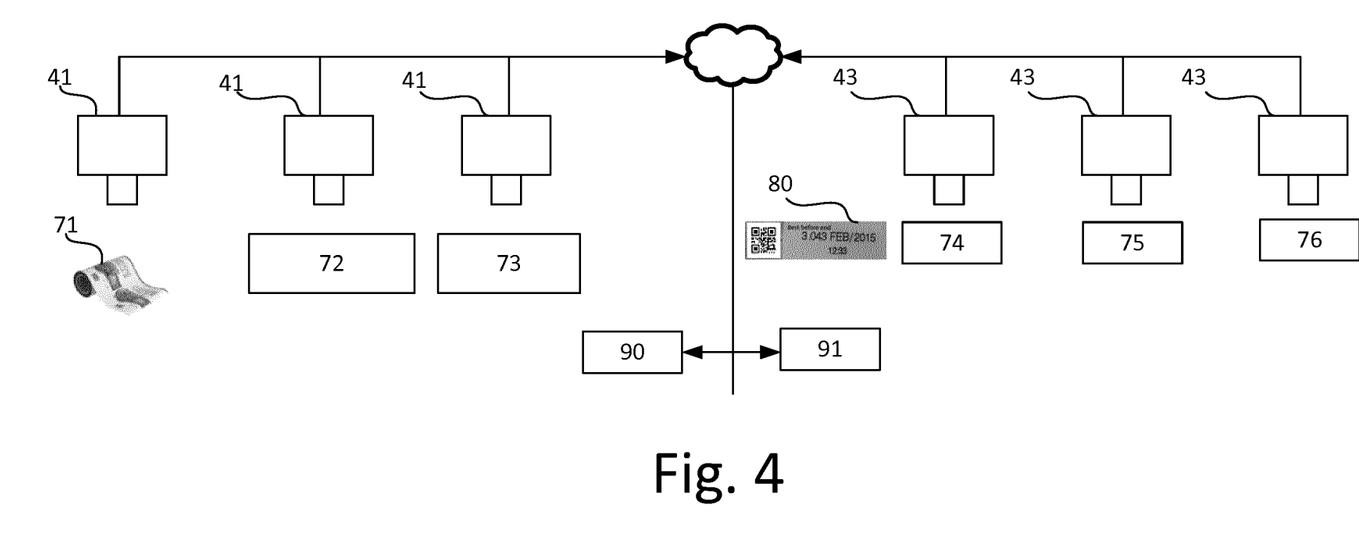
FIG. 4 is a diagram of an exemplary processing steps according to one embodiment used in the system of FIG. 1.

FIG. 4 illustrates another embodiment of the present invention in an application for packaging and different methods of charging.

According to this embodiment, any serialized code 61 (e.g. QR code, dotcode, etc.) is printed on any material or product with any digital printer before production and any product data (e.g. lot number, best before date, date, etc.) is printed at or after production. The serialized data and product data are merged at or after production.

A number of cameras 41 and 43 are arranged to detect serialized codes in different locations of the production line and use the information for e.g. verification and charging purpose. For example, before production the packaging substrate 71 may be scanned for pay per material, a product counter 72 for pay per detect, a scale for pay per weigh, etc.

During the production and printing the product data 80, the print product may be scanned for detecting, after a printer 74, the codes and pay per code, in a packaging machine 75 counting package and pay per box, and in a pallet packaging machine 76 scan for number of pallets.

The scanned and financial information can be sent to financial services 90, used for royalties 91, etc.

In yet another application of the invention a serialized code (e.g. QR code, dot-code) is printed on any material or product before production and a product data (e.g. lot number, best before date, date, etc.) is printed at or after production. The serialized code and product data are merged at or after production within a database or so called cloud storage. In the packaging facility (production facility) each package is filled with a unique content, e.g. different number of units, content with different colours, different shape, different weight, different taste, different smell, etc., and the unique content is associated with the unique data stored in the database or cloud.

Figure 5:
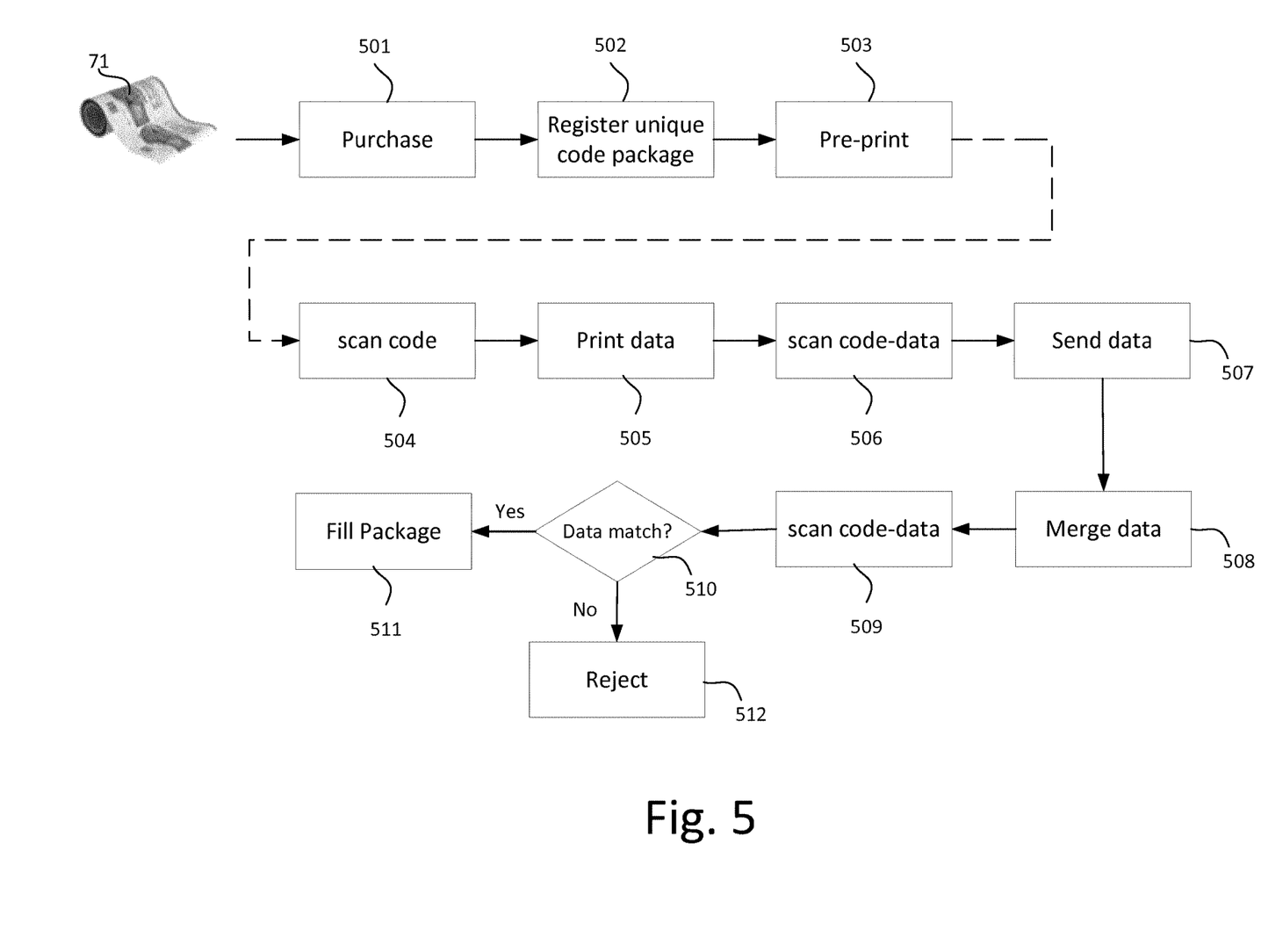
FIG. 5 is a diagram of an exemplary processing steps according to another embodiment used in the system of FIG. 1.

With reference to the flow diagram of FIG. 5:

1. A manufacturer purchases 501 packaging material 71 from a converter, print service provider or any other third party with a digital printer;
2. A unique code package is registered 502 in a database distributed database (e.g. blockchain) or cloud storage.
3. A digital printer pre-prints 503 the unique codes on the packaging material to make each package unique (e.g. on film role or on packaging sheet, a substrate). The individual packages may be part of a roll, plate etc.
4. At factory/manufacturing site, each unique code is scanned 504 with a scanner and/or vision camera.
5. A product data (e.g. lot number, best before date, unique content, serialized data) is printed 505 on a pre-defined location on the unique packaging.
6. A scanner and/or vision camera scans 506 after printing the unique code and product data.
7. All information is transmitted 507 to the manufacturer's preferred print controller system (e.g. MES, Middleware, CoLOS). The disparate sets of data are merged (e.g. combined, linked, related, etc.) 507 and stored in the database or cloud storage.
8. At factory/manufacturing site, each unique code is scanned 508 again with a scanner and/or vision camera. Of course, other codes/product information can optionally be read and checked for quality checking purpose, for example.
9. Production:
   if 510 the merged data matches the requirements (e.g. correct relation between the sterilized data and product information, right package and product to be packaged, etc.), the packaging will be filled 511 with a unique content (e.g. different number of units, different colours, different shape, different weight, different quality, different taste, different smell); and
   if the merged data does not meet the requirements, the packaging will be rejected 512.

At any step of the value chain (distribution network)—the manufacturer, wholesaler, distributor, retailer, customer—can effectively scan the unique code to obtain information and use for a variety of purposes.

Abovementioned requirements may comprise the product manufacturer defined criteria's, e.g. that the readability of the codes meet a defined criteria, that it is the right pack before filling, etc. Normally, it is expensive to fill a pack and then have to re-work it if something is wrong, so the invention provides for a safe check before filling. Moreover, this allows ability to: produce unique packaging material with unique codes and unique content (digital production); and to match supply and demand (personalized production).

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

Software and web implementations of various embodiments of the present invention can be accomplished with standard programming techniques with rule-based logic and other logic to accomplish various database searching steps or processes, correlation steps or processes, comparison steps or processes and decision steps or processes.

The various embodiments of the present invention described herein is described in the general context of method steps or processes, which may be implemented, entirely or partly, in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method of providing a series of serialized unique information on an individual substrate in series of substrates and subsequently applying a product related information on each substrate, the method comprising:
    registering a unique code package in a database;
    pre-printing a serialized unique information from the unique code package using a digital printer device configured to print from a digital-based image directly on the individual substrate, wherein the serialized unique information is unique in content and/or appearance for each time it is printed;
    retrieving an image of each individual substrate including the serialized unique information and associating each individual substrate with a product;
    printing by an industrial printer the product related information on the individual substrate;
    recording image of the printed serialized unique information and product related information on each individual substrate by means of an image recorder; and
    analysing the recorded image of printed serialized unique information and product related information on the individual substrate.

2. The method of claim 1, wherein the individual substrate is used as packaging material, part of a product or in connection with a product.

3. The method of claim 1, comprising an additional step of analysing the printed serialized unique information prior to printing the product related information.

4. The method of claim 1, wherein the result of analysing the printed serialized unique information on the substrate and product related information is used for discarding the individual substrate or its content.

5. The method of claim 1, comprising transferring and storing information about the serialized unique information and the product related information in a data storage device.

6. The method of claim 1, comprising scanning the printed serialized unique information prior to the printing the product related information using an image scanning or an image recording device.

7. The method of claim 1, comprising scanning the printed serialized unique information and the product related information using an image scanning or an image recording device.

8. The method of claim 1, wherein each serialized unique information has a relation to a preceding and a next serialized unique information.

9. The method of claim 8, wherein the serialized unique information is not reprinted.

10. The method of claim 1, wherein a serialized information batch is provided by one or several parties depending on data privacy, comprising one or several of government, manufacturer, converter, print service provider, coding manufacturer.

11. The method of claim 1, wherein the serialized unique information is realized in form of a machine readable/recognizable/detectable code, one or several of barcode symbology and standards: GS1, DataMatrix, Codabar, EAN, GTIN, ISBN, UPC, barcodes, dotcode or QR-codes, or character combination, digit combination, images, electrical circuits or RFIDs or combinations thereof.

12. The method of claim 1, further comprising generating a merged data comprising the serialized unique information with the product related information, verifying the merged data and if the merged data matches a set of requirements, filling packages made of the substrate with a unique content.

13. A system for providing a series of serialized unique information on an individual substrate in a series of substrates and subsequently applying a product related information on each individual substrate, the system comprising:
    a digital printer device configured to print from a digital-based image directly,
    an industrial printer,
    a data storage device,
    an image recording or scanning devices, and
    a controller;
    wherein the system is configured to register a unique code package in a database;
    instruct said digital printer device directly on the substrate in a first instance to print said series of serialized unique information from a batch of serialized unique information, wherein the serialized unique information is unique in content and/or appearance for each time it is printed;

transfer and store information about the serialized unique information to the data storage device;

retrieve an image of each individual substrate including the serialized unique information and associate each individual substrate with a product:

print the product related information on the individual substrate using said industrial printer;

recording by said image recording or scanning device said printed information comprising said unique serialized information and the product related information; and analysing by said controller the printed serialized unique information and product related information on the individual substrate.

14. The system of claim 13, wherein the storage device is a central storage device being one or several of a database, a cloud service or digital information distribution system.

15. A controller for providing a series of serialized unique information on an individual information carrier n a series of information carriers together with product related information, the controller comprising:

a processor a memory, communication interface, configured to communicate with a printer device configured to print from a digital-based image directly, and an industrial printer, a data storage device, and an image recording or scanning device, wherein the controller is further configured to:

provide said digital printer device said series of serialized unique information from a batch of serialized unique information on the individual substrate in a first instance, wherein the serialized unique information is unique in content and/or appearance for each time it is printed;

store the information about the serialized unique information to the data storage device;

retrieve an image of each individual substrate including the serialized unique information and associating each substrate with a product;

provide said industrial printer with instructions to print the product related information on the individual substrate using said industrial printer;

retrieve data from said image recording or scanning device relating to said printed information comprising said unique serialized information and product related information; and analyse the printed serialized unique information and product related information on the individual substrate.

16. The method of claim 1, wherein the unique serialized information is associated with blockchain.

* * * * *